US 11,759,943 B2

(12) United States Patent
Tarbaieva et al.

(10) Patent No.: US 11,759,943 B2
(45) Date of Patent: Sep. 19, 2023

(54) ROBOTS AND SYSTEMS FOR AUTOMATED STORAGE AND RETRIEVAL

(71) Applicant: Ferromotion Technologies Inc., San Carlos, CA (US)

(72) Inventors: Vira Tarbaieva, Newton, MA (US); Andriy Volodymyrovych Shvydky, Kyiv (UA); Mykhailo Anatolievich Smetaniuk, Kyiv (UA); Victor Anatolievich Smetaniuk, Kyiv (UA)

(73) Assignee: Ferromotion Technologies Inc., San Carlos, CA (US)

( * ) Notice: Subject to any disclaimer, the term of this patent is extended or adjusted under 35 U.S.C. 154(b) by 103 days.

(21) Appl. No.: 17/391,382

(22) Filed: Aug. 2, 2021

(65) Prior Publication Data
US 2021/0402588 A1    Dec. 30, 2021

Related U.S. Application Data

(63) Continuation of application No. 16/231,347, filed on Dec. 21, 2018, now Pat. No. 11,110,593.
(Continued)

(51) Int. Cl.
*B60B 19/00*    (2006.01)
*B25J 9/16*    (2006.01)
(Continued)

(52) U.S. Cl.
CPC ............. *B25J 5/007* (2013.01); *B25J 9/1633* (2013.01); *B25J 9/1694* (2013.01); *B25J 13/085* (2013.01);
(Continued)

(58) Field of Classification Search
CPC .... B62D 55/265; B65G 1/0492; B65G 54/02; G05D 2201/0216; B25J 5/007;
(Continued)

(56) References Cited

U.S. PATENT DOCUMENTS 3,764,777 A * 10/1973 Sakabe ............. B23K 37/0264
228/45
4,531,460 A * 7/1985 Pamer ....................... B66C 7/02
105/154
(Continued)

FOREIGN PATENT DOCUMENTS

EP        3067258        9/2016
WO    WO 2015/122780 A1    8/2015

OTHER PUBLICATIONS

Cardenas, Design of novel adaptive magnetic adhesion mechanism for climbing robots in ferric structures. The University of Sheffield. Thesis. Nov. 2016.
(Continued)

*Primary Examiner* — Tony H Winner
*Assistant Examiner* — Michael R Stabley
(74) *Attorney, Agent, or Firm* — Wolf, Greenfield & Sacks, P.C.

(57) ABSTRACT

Automated storage and retrieval systems which include robots that move along ceilings and/or walls to retrieve and/or transport goods. The robots use magnetic adhesion to hold to the surfaces. The robots adjust the magnetic adhesion force in response to changes in weight or other conditions.

22 Claims, 13 Drawing Sheets

Related U.S. Application Data

(60) Provisional application No. 62/610,150, filed on Dec. 23, 2017.

(51) Int. Cl.
*B25J 13/08* (2006.01)
*B25J 5/00* (2006.01)
*G05D 1/02* (2020.01)
*B65G 1/04* (2006.01)
*B65G 54/02* (2006.01)

(52) U.S. Cl.
CPC .......... *B60B 19/006* (2013.01); *B65G 1/0464* (2013.01); *B65G 1/0471* (2013.01); *B65G 1/0492* (2013.01); *G05D 1/0287* (2013.01); *B60B 19/00* (2013.01); *B65G 54/02* (2013.01); *G05D 2201/0216* (2013.01)

(58) Field of Classification Search
CPC ...... B25J 9/1633; B25J 9/1694; B25J 13/085; B60B 19/006
See application file for complete search history.

(56) References Cited

U.S. PATENT DOCUMENTS

| | | | | |
|---|---|---|---|---|
| 4,828,059 | A * | 5/1989 | Naito | B62D 55/265 |
| | | | | 305/164 |
| 5,049,218 | A * | 9/1991 | Martin | F16C 39/063 |
| | | | | 156/577 |
| 5,285,601 | A | 2/1994 | Watkin et al. | |
| 5,363,935 | A | 11/1994 | Schempf et al. | |
| 5,435,405 | A | 7/1995 | Schempf et al. | |
| 5,511,487 | A * | 4/1996 | Sakagami | B61B 3/02 |
| | | | | 104/295 |
| 5,894,901 | A | 4/1999 | Awamura et al. | |
| 6,036,427 | A * | 3/2000 | Kita | B61B 13/00 |
| | | | | 104/119 |
| 6,886,651 | B1 * | 5/2005 | Slocum | B61C 11/00 |
| | | | | 104/282 |
| 8,215,435 | B2 * | 7/2012 | Dvorak | B60B 19/006 |
| | | | | 180/164 |
| 8,505,663 | B2 | 8/2013 | Saylor et al. | |
| 8,567,536 | B1 | 10/2013 | Canfield et al. | |
| 8,905,174 | B2 | 12/2014 | Saylor, Jr. | |
| 9,168,786 | B2 | 10/2015 | Schlee et al. | |
| 9,359,027 | B2 | 6/2016 | Saylor, Jr. | |
| 9,533,724 | B2 * | 1/2017 | Troy | B64F 5/60 |
| 9,586,636 | B1 * | 3/2017 | Burmeister | B62D 53/028 |
| 10,252,412 | B2 * | 4/2019 | Nguyen | B25J 5/007 |
| 10,829,171 | B2 * | 11/2020 | Parrott | B62D 57/024 |
| 11,110,593 | B2 | 9/2021 | Tarbaieva et al. | |
| 2010/0212983 | A1 * | 8/2010 | Lama | B62D 57/024 |
| | | | | 180/54.1 |
| 2012/0116583 | A1 | 5/2012 | Canfield et al. | |
| 2014/0076223 | A1 | 3/2014 | Smith | |
| 2014/0152803 | A1 | 6/2014 | Carlson et al. | |
| 2018/0313715 | A1 | 11/2018 | Cichosz et al. | |
| 2019/0283820 | A1 | 9/2019 | Park | |

OTHER PUBLICATIONS

Espinoza et al., Adhesion loss prediction of a climbing robot through magnetic field analysis by artificial neural networks. ABCM Symposium Series in Mechatronics. 2014;6:693-704.

Santos et al., Quasi-Omnidirectional Fuzzy Control of a Climbing Robot for Inspection Tasks. Journal of Intelligent & Robotic Systems. 2018;91:333-47.

Silva et al., Climbing robot for ferromagnetic surfaces with dynamic adjustment of the adhesion system. Journal of Robotics. 2012;2012:1-16.

Song et al., Design of permanent magnetic wheel-type adhesion-locomotion system for water-jetting wall-climbing robot. Advances in Mechanical Engineering. 2018;10(7):1-11.

Tavakoli et al., OmniClimbers: Omni-directional magnetic wheeled climbing robots for inspection of ferromagnetic structures. Robotics and Autonomous Systems. 2013;61(9):997-1007.

Wu et al., Design and optimal research of a non-contact adjustable magnetic adhesion mechanism for a wall-climbing welding robot. Int J Adv Robot Sy. 2013;10(63):1-9.

Yanqiong et al., Design and Analysis of Modular Mobile Robot with Magnetic Wheels. WSEAS Transactions on Applied and Theoretical Mechanics. 2008;3(12):902-11.

* cited by examiner

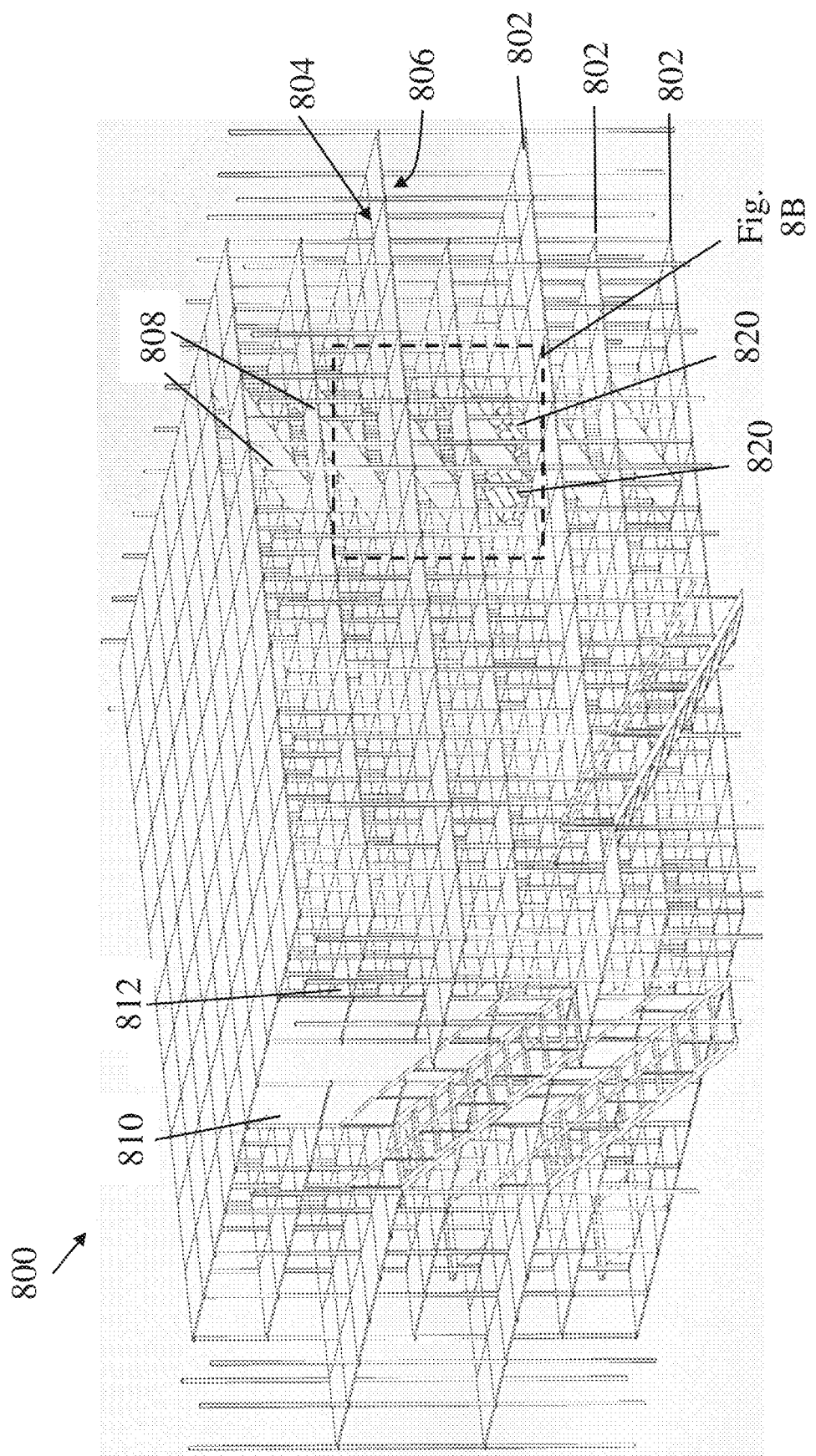

ROBOTS AND SYSTEMS FOR AUTOMATED STORAGE AND RETRIEVAL

CROSS-REFERENCE TO RELATED APPLICATIONS

This application is a continuation of U.S. application Ser. No. 16/231,347, filed Dec. 21, 2018, which claims the benefit under 35 U.S.C. § 119(e) of U.S. provisional application Ser. No. 62/610,150, filed Dec. 23, 2017, entitled FERROMAGNETIC LOCOMOTION MACHINE, the disclosures of each of which are incorporated herein by reference in its entirety.

FIELD

Disclosed embodiments relate to robots and robotic systems for transporting payloads, and more particularly to robots including one or more magnets to adhere to the robots a surface on which the robots are movable.

DISCUSSION OF RELATED ART

Robots and robotic systems are widely used to accomplish a variety of tasks. Some systems include robots that are configured for movement along surfaces, including inclined surfaces and/or vertical walls, and such robots may perform one or more tasks while moving along these surfaces such as inspection, cleaning, and/or welding tasks.

SUMMARY

In one embodiment, a robot for transporting a payload comprises a locomotion system configured to permit the robot to move along a surface, a retainer constructed and arranged to hold a payload, and one or more adhesion magnets constructed and arranged to adhere the robot to the surface via an attractive magnetic force. The robot further includes a load sensor and a controller configured to adjust the attractive magnetic force in response to a change in a force measured by the load sensor.

In another embodiment, a robot for transporting a payload comprises a retainer constructed and arranged to hold a payload, a drive system comprising one or more wheels coupled to the robot, the drive system being configured to move the robotic system along a surface, and one or more adhesion magnets constructed and arranged to adhere the robot to the surface via an attractive magnetic force. The robot also includes one or more load sensors configured to detect a force between the surface and robot, and an adhesion magnet actuator configured to move a first adhesion magnet of the one or more adhesion magnets relative to the surface to adjust a magnitude of the attractive magnetic force in response to a change in the force detected by the one or more load sensors.

In a further embodiment, a method is provided for operating a robot on a downwardly-facing surface or a wall surface, the robot including a load sensor and a locomotion system. The method comprises: (a) receiving a force measurement from each of one or more load sensors when the robot is suspended from the downwardly-facing surface and holding a payload; (b) adjusting a magnitude of an attractive magnetic force between the robot and the downwardly-facing surface based at least in part on the force measurement(s) to maintain a net force between the robot and the downwardly-facing surface which is sufficient to maintain contact between the robot and the downwardly-facing surface; and (c) moving the robot along the surface.

In yet another embodiment, a method is provided for operating a robot on a surface, the robot including a load sensor and a locomotion system. The method comprises: (a) receiving a force measurement from a load sensor when the robot is positioned on the surface; (b) moving the robot along the surface; and (c) adjusting a magnitude of an attractive magnetic force between the robot and the surface while the robot is moving along the surface, based at least in part on the force measurement, to maintain at least a certain minimum net force between the robot and the surface.

In another embodiment, a method is provided for operating a robot on a surface, the robot having one or more adhesion magnets to apply a magnetic attraction force between the robot and the surface. The method comprises: (a) measuring a net force between a robot and surface; (b) using a controller to determine whether to adjust the net force; (c) adjusting the magnetic attraction force between the robot and the surface based on the controller's determination; and (d) moving the robot along the surface.

In yet another embodiment, a system for storing and transporting objects, comprises a storage structure comprising a downwardly-facing surface positioned above a plurality of objects and a robot comprising one or more adhesion magnets. The robot is held to the downwardly-facing surface by the one or more adhesion magnets, and the robot comprises a retainer configured to hold one or more of the plurality of objects.

In a further embodiment, a system for storing and transporting objects comprises a storage structure comprising a downwardly-facing surface positioned above a plurality of objects, and a robot comprising one or more adhesion magnets. The robot is held to the downwardly-facing surface by a magnetic adhesion force from the one or more adhesion magnets, and a magnitude of a magnetic adhesion force is adjustable based on a weight of a payload held by the robot, the payload comprising one or more of the plurality of objects.

In another embodiment, a system for storing and transporting objects comprises a storage structure comprising a first surface and a first robot configured to travel on the first surface. The robot comprises one or more adhesion magnets constructed and arranged to adhere the robot to the surface via an attractive magnetic force, a load sensor, and a controller configured to adjust the attractive magnetic force in response to a change in a force measured by the load sensor.

In yet another embodiment, a robot for transporting a payload, comprises a chassis including a retainer constructed and arranged to hold a payload, and a drive system configured to move the robotic system along a surface. The drive system comprises first, second, and third wheels attached to the chassis, and each wheel is attached to the chassis via a respective axle. The drive system further comprises a first motor coupled to the first wheel. The robot further comprises, one or more load cells, and each load cell is constructed and arranged to measure a force between the robot and the surface. Moreover, the robot comprises one or more adhesion magnets constructed and arranged to generate an attractive magnetic force between the magnetic fasteners and the surface, a location sensor configured to detect a location of the robot along the surface, and a controller operatively coupled to the drive system, the load sensors, and the one or more adhesion magnets. The controller is configured to adjust a magnitude of the attractive magnetic force based on a net force between the robot and the surface, the net force determined at least in part based on forces detected by the load sensors.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 8A is a perspective view of an automated storage and retrieval system, according to one embodiment;

DETAILED DESCRIPTION

Figure 1A:
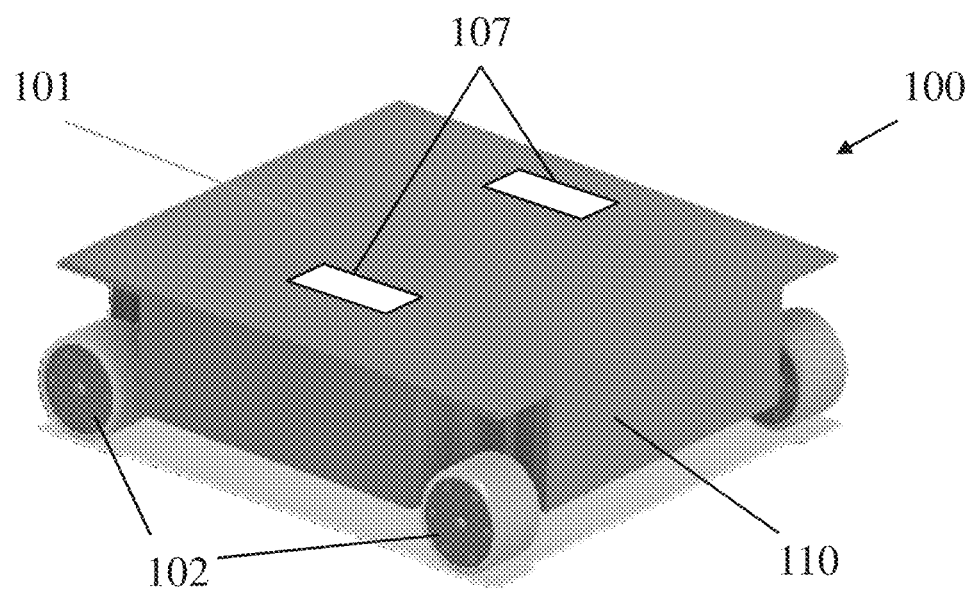
FIG. 1A is a perspective view of a robot, according to one embodiment.

Aspects described herein relate to robots that are movable along surfaces to retrieve and transport payloads. In some instances, a surface along which a robot is movable may be inclined, vertical, or downwardly-facing (e.g., a ceiling or a downwardly-facing ramp), and the robot may be constructed and arranged to maintain contact with the surface via an attractive magnetic force between the robot and the surface. For example, the robot may include one or more adhesion magnets configured to interact with a surface such as a ferromagnetic surface to generate a suitable adhesion force.

The inventors have recognized and appreciated that robots moving along surfaces may experience variable forces, for example, due to varying orientations of the surfaces, and/or when the robots are transporting payloads of different weights or sizes. The inventors have also recognized and appreciated that it would be helpful for a robot to be able to pick up a payload of unknown weight without human intervention. The inventors have appreciated numerous benefits associated with robots constructed and arranged to dynamically adjust the strength of the magnetic adhesion force between a robot and a surface based on a net force acting between the robot and the surface. The net force may be measured substantially continuously via one or more load sensors on the robot, and the robot may adjust the magnitude of the attractive magnetic force based on the measured net force value. In this manner, the robots described herein may provide for real-time monitoring of the net force, and the attractive magnetic force may be dynamically adjusted in response to changes in the net force measured by the one or more load cells.

For example, if a robot suspended from a downwardly-facing surface picks up a payload, the net force between the robot and the surface would tend to decrease due to an increased gravitational force acting on the robot. Upon sensing the decrease in the net force via the one or more load sensors, the robot may increase the magnitude of the attractive magnetic force—thereby increasing the contact force between the robot and the surface—such that the robot maintains contact with the surface. Moreover, according to some aspects, the magnitude of the magnetic attractive force may be adjusted to maintain a net force sufficient to maintain contact between the robot and the surface while also permitting movement of the robot along the surface.

In some embodiments, a robot for transporting a payload may comprise a locomotion system configured to permit the robot to move along a surface (such as a horizontal, inclined, and/or downwardly facing surface). For example, the locomotion system may include one or more of wheels, sliders, rails, treads, tracks, legs, or any other suitable structure for permitting movement of the robot along the surface. In one exemplary embodiment, the locomotion system comprises three or more wheels attached to the robot via respective axles. Depending on the particular embodiment, the robot may be propelled along the surface via a drive system, which may be located on the robot, or may be external to the robot. For example, a drive system on the robot may include one or more motors coupled to one or more wheels (or other suitable structures) of the locomotion system such that the robot may propel itself along the surface. Alternatively or additionally, an external drive system may include one or more of cables, conveyors, pulleys, or other suitable structures that may be attachable to the robot to propel the robot along the surface. Accordingly, it should be understood that the current disclosure is not limited to robots including any particular arrangements for propelling the robots along a surface.

As noted above, a robot may use an attractive magnetic force to adhere the robot to the surface and maintain contact between the robot and the surface. In some embodiments, the robot may include one or more adhesion magnets configured to generate the attractive magnetic force to adhere the robot to the surface, and the adhesion magnets may adjustable to adjust a magnitude of the attractive magnetic force. For example, in some embodiments, the adhesion magnets may include one or more permanent magnets, and the magnitude of the attractive magnetic force may be adjusted by moving the adhesion magnet relative to the surface. For example, the adhesion magnet may be translated towards or away from the surface and/or by rotating the adhesion magnet relative to the surface). In other embodiments, the one or more adhesion magnets may comprise an electromagnet, and the attractive magnetic force may be adjusted, at least in part, by adjusting the current supplied to the electromagnet.

As discussed above, the attractive magnetic force may be adjusted in response to a change in a net force between the robot and the surface, which may be repeatedly monitored by one or more load sensors on the robot. Accordingly, it should be understood that the adhesion magnets may be adjustable in real time in response to changes in the net force measured by the load sensors. For example, in some embodiments, the load sensors may be configured to measure the net force at least about 1 time per second. In some embodiments, the rate may be at least 10 times per second. In some embodiments, the load sensors may be configured to measure the net force between at a rate somewhere between 10 and 100 times per second (e.g., about 40 times per second, about 60 times per second, or about 80 times per second). In some embodiments, the rate be less than 10,000, times per second, or at a rate of less than 1,000 times per second (e.g., less than 750 times per second, less than 500 times per second, or less than 250 times per second), and the adhesion magnets may be adjusted based on each measured force value, if necessary.

In this manner, the adhesion magnets may be dynamically adjusted to maintain the robot in contact with the surface and also permit movement of the robot along the surface while the robot performs various tasks, such as retrieving and transporting payloads with varying weights, moving along surfaces with different orientations, and/or moving between surfaces having different magnetic properties. In particular, as the adhesion magnets are adjusted, the change in the attractive magnetic force leads to a change in the net force measured by the load cells, which can subsequently be used to further adjust the adhesion magnets to achieve a desired net force value. The inventors have recognized and appreciated that this real-time approach using feedback between the load sensors and the adhesion magnets to control the attractive magnetic force may provide numerous benefits compared to static approaches, such as pre-calculating magnetic forces from the adhesion magnets as a function of the position and/or orientation of the adhesion magnets (e.g., using classical magnetic theory). Specifically, the inventors have appreciated that such static approaches may be sensitive to numerous factors (e.g., temperature, humidity, type of magnetic material, dust present in system, and so on), such that an appropriate attractive magnetic force may not be achieved.

In certain embodiments, the adhesion magnets may be adjusted to provide a minimum net attractive force between the robot and the surface. For example, when the robot is suspended from a horizontal downwardly-facing surface, a minimum attractive magnetic force may between about 1.3 to about 1.5 times the gravitational force acting on the robot, which may correspond to a minimum net force magnitude value between about 0.3 and about 0.5 times the gravitational force acting on the robot; these forces may be sufficient to securely maintain the robot in contact with the surface. In some instances, the minimum net attractive force may be selected to maintain adhesion to the surface while avoiding unnecessary reduction in the mobility of the robot and/or excessive energy consumption that may result from increased friction due to excessive magnetic adhesion forces.

In some embodiments, the one or more load sensors may be coupled to one or more components of a locomotion system and/or drive system on a robot. For example, in one exemplary embodiment in which the locomotion system includes a plurality of wheels coupled to the robot via respective axles, a load sensor may be coupled to each axle to measure the force between each wheel and the surface. In this manner, the load sensors are able to accurately measure the net force acting between the robot and the surface. It should be understood that the current disclosure is not limited to any particular type of load sensor. For example, the load sensors may comprise one or more strain gauges (e.g., resistive strain gauges) configured to determine a load based on a measured strain and/or may comprise load cells (e.g., bending beam, piezoelectric hydraulic, and/or pneumatic load cells).

According to some aspects, a robot may include a plurality of load sensors and a plurality of adhesion magnets, and the robot may use forces measured from each of the load sensors to individually adjust an attractive magnetic force generated by each of the adhesion magnets. In this manner, the robot may balance the forces on the robot to accommodate varying conditions, such as changes in orientation of a surface on which the robot is moving and/or shifts in a center of mass location of the robot (e.g., upon receiving a payload and/or upon a shift in the contents of a payload carried by the robot).

In some embodiments, a robot may include a retainer constructed and arranged to hold a payload on the robot. For example, the retainer may include one or more features to secure the payload to the robot such that the payload is held to the robot when the robot moves along surfaces with varying orientations (e.g., along downwardly-facing surfaces from which the robot is suspended). However, it should be understood that other retainer configurations may be suitable in some applications. For instance, a retainer may include a platform on which a payload can be placed or a receptacle that receives a payload, and frictional forces may be sufficient to hold the payload in the retainer. In some embodiments, a robot may further include a gripper configured to retrieve the payload from a storage location. For example, the gripper may be movable relative to the retainer to move the payload from the storage location to the retainer. Moreover, in some instances, a gripper may form a part of the retainer. For example, the gripper may secure the payload to the retainer to hold the payload in place after retrieving the payload from the storage location. After receiving a payload in a retainer, a robot may move along a surface to transport the payload to a delivery location, and subsequently, the payload may be removed from the retainer. For instance, a robot including a gripper may use the gripper to offload the payload from the robot.

In addition to the above, a robot may include a controller configured to control one or more aspects of the operation of the robot. For example, the controller may be coupled to the load sensors and adhesion magnets, and the controller may be configured to adjust the attractive magnetic force of the adhesion magnets based on the forces measured by the load sensors. Alternatively or additionally, the controller may be coupled to a drive system to control movement of the robot along a surface. Moreover, in some embodiments, a robot may include one or more sensors to detect a location of the robot along the surface, and the controller may control the drive system to propel the robot along the surface based on location data measured by the location sensor. In embodiments including a gripper, the controller may further be coupled to the gripper to control loading and unloading of payloads. Depending on the particular embodiment, a controller may be mounted on the robot, and/or a robot may communicate with a centralized control system separate from the robot. In some applications, multiple controllers may be used to control different aspects of the operation of a robot. For example, a robot may include one or more controllers located on the robot to control the adhesion magnets and drive system, while a remote, centralized control system may control aspects related to the location of the robot and transporting payloads to different locations. However, it should be understood that the current disclosure is not limited to any particular configuration of controllers.

According to some aspects, the robots described herein may be implemented as part of an automated storage and retrieval system (AS/RS), in which a plurality of objects are stored within a storage structure such as a rack system. In some embodiments, the storage structure may include surfaces on which one or more robots can move to transport objects within the storage system. For example, the storage system may include magnetic surfaces to which the above-described robots can adhere while transporting payloads including one or more objects throughout the storage system. The inventors have recognized and appreciated that such arrangements for an AS/RS may provide numerous advantages compared to conventional AS/RS systems. For example, because the robots may be able to move along any suitable surfaces of the storage structure, an AS/RS according to the present disclosure may not require any complex rail or guide structures which are often used in conventional systems. In this manner, the systems described herein may allow for simpler installations, lower costs, and/or improved modularity compared to conventional systems.

In some embodiments, an AS/RS may include a storage structure comprising multiple levels of storage, and each level may be connected by one or more ramps or walls. With such arrangements, one or more robots as described herein may be movable throughout the storage structure, including between levels by moving along the walls and/or ramps. Moreover, the robots may travel along downwardly-facing surfaces that form the ceilings of each level in the storage structure. In this manner, a robot may move along a ceiling to a location above a payload, and the robot may retrieve the payload, for example, via a gripper that is extendable below the robot to the underlying surface on which the payload is stored. The robot may subsequently transport the payload to a delivery location where the payload is unloaded from the robot. In some instances, the delivery location may be a different location within the storage structure. In other cases, the delivery location may correspond to a location of another robot, such that the payload may be transferred between different robots moving within the storage system.

In some implementations, a plurality of robots in an AS/RS may be configured with traffic rules to improve capacity or productivity of the system as a whole. For example, as noted above, the robots may communicate with a centralized controller which may control the individual robots by sending reconciled commands to each robot. Accordingly, in some embodiments, each robot may not be required to have information about any of the other robots in the system (such as their number, tasks, or behavior). However, other implementations may use a less centralized approach in which individual robots receive higher level instructions regarding one or more tasks, such as instructions relating to transporting a payload within the storage structure.

Depending on the particular embodiment, the surfaces on which the robots described herein may adhere via one or more adhesion magnets may include any suitable magnetic surface, such as a surface comprising a ferromagnetic material. For example, a surface may include a ferrous material such as iron or an iron alloy (e.g., a steel alloy). In other embodiments, surfaces comprising an arrangement of permanent magnets and/or electromagnets that can interact magnetically with one or more adhesion magnets on the robots may be suitable. Moreover, in some embodiments, a surface may comprise paramagnetic material, a ferromagnetic material, or any other suitable magnetic material that can interact with the adhesion magnets to provide a sufficient attractive magnetic force. Additionally, combinations of the above described materials and/or arrangements may be suitable. Accordingly, it should be understood that the current disclosure is not limited to any particular type of magnetic surface on which the robots move. In addition to the above, it should be understood that in some instances, the robots may move along a non-magnetic surface. For example, the robots may travel along horizontal surfaces and/or inclined surfaces on which frictional forces are sufficient to maintain contact between the robot and the surface while also permitting movement of the robot along the surface.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
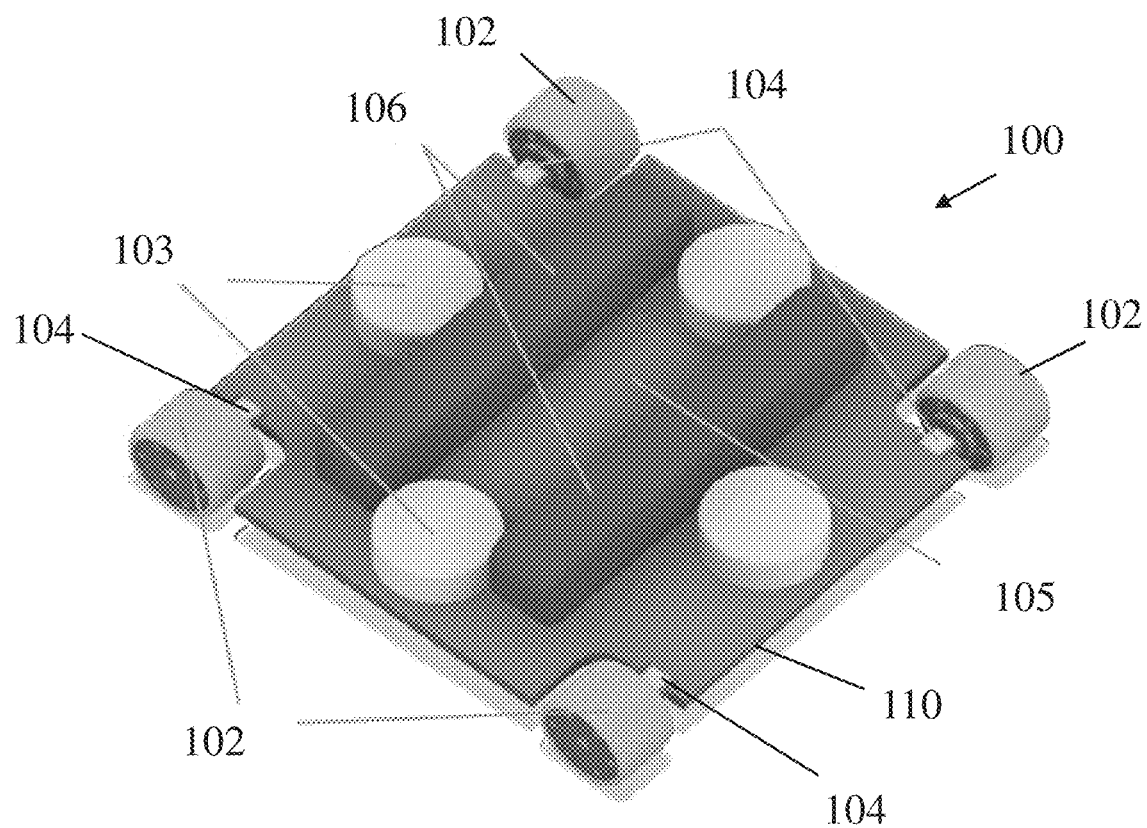
FIG. 1B is an interior view of the robot of FIG. 1A.

FIGS. 1A-1B depict one embodiment of a robot 100 according to some aspects of the current disclosure. The robot 100 includes a chassis 110 on which a locomotion system is mounted to permit movement of the robot along a surface. In the depicted embodiment, the locomotion system includes four wheels 102 positioned around the chassis 110, though it should be understood that other features capable of permitting movement of the robot along the surface (e.g., treads, rails, legs, and so on) also may be suitable. While at least four wheels may be used in some embodiments, other numbers of wheels may be used, for example at least one wheel, at least two wheels, at least three wheels, at least five wheels, or any suitable number of wheels.

As shown in FIG. 1A, the robot includes a retainer 101 configured to hold a payload (not depicted) such that the robot may transport a payload (e.g., within an AS/RS or other suitable system). In the depicted embodiment, the retainer 101 is formed as a platform on which the payload can be placed, however, other arraignments may be suitable, such as a retainer configured as a receptacle. Moreover, retaining elements 107 may be included on the retainer to secure the payload to the retainer. For example, the retaining elements may include one or more grippers, clips, latches, adhesive surfaces, fasteners (e.g., temporary fasteners such as hook-and-loop type fasteners), or any other retaining structure capable of securing a payload to the retainer. While two retaining elements 107 are depicted in FIG. 1A, it should be appreciated that any suitable number and/or arrangement of retaining elements may be used, as the current disclosure is not limited in this regard.

FIG. 1B depicts the interior of the robot 100 of FIG. 1A. As illustrated, the robot includes adhesion magnets 103 distributed around the chassis 110; as discussed above and as described in more detail below, the adhesion magnets 103 are configured to generate an attractive magnetic force between the robot and the surface on which the robot moves to maintain contact between the robot and the surface.

Additionally, the robot includes load sensors 104 coupled to each wheel 102 of the locomotion system. In this embodiment, the load sensors are mounted on respective axles connecting each wheel 102 to the chassis 110, such that the load sensors are configured to measure a net force between each wheel 102 and the surface. The load sensors 104 and adhesion magnets 103 are operatively coupled to a controller 105 that is configured to adjust the attractive magnetic force from each adhesion magnet in response to changes in the forces measured by the load sensors 104. Moreover, the robot includes one or more power supply units such as batteries 106 to provide power to the various systems of the robot, such as to adjust the attractive magnetic force provided by the adhesion magnets 103.

While the embodiment depicted in FIGS. 1A-1B includes four adhesion magnets 103 distributed around the chassis 110, it should be understood that other arrangements may be suitable. For example, other embodiments may use two adhesion magnets located on opposing sides of the chassis, a single adhesion magnet positioned in a central location on the chassis (e.g., near the geometric center of the chassis or near the center of mass of the robot), or the robot may use more than four adhesion magnets arranged in any suitable configuration.

Figure 2A:
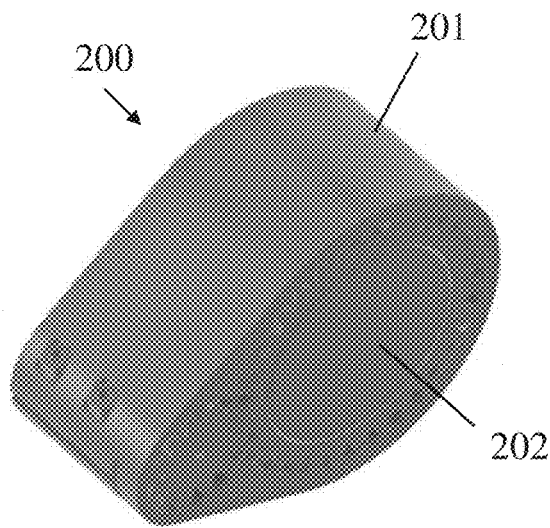
FIG. 2A is a perspective view of an adhesion magnet with the magnet in a retracted position, according to one embodiment.
Figure 2B:
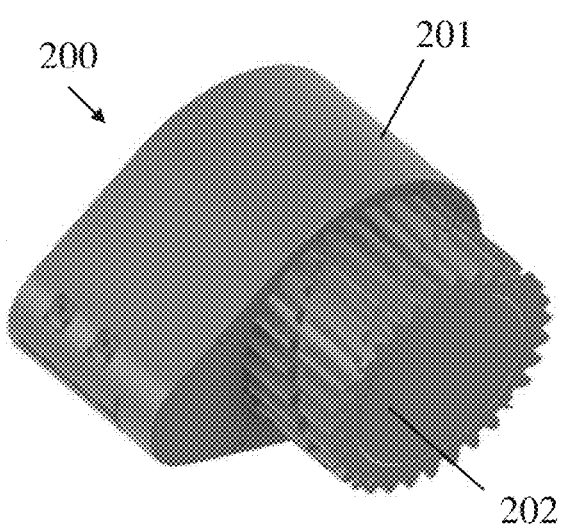
FIG. 2B is a perspective view of the adhesion magnet of FIG. 2A with the magnet in an extended position.
Figure 2C:
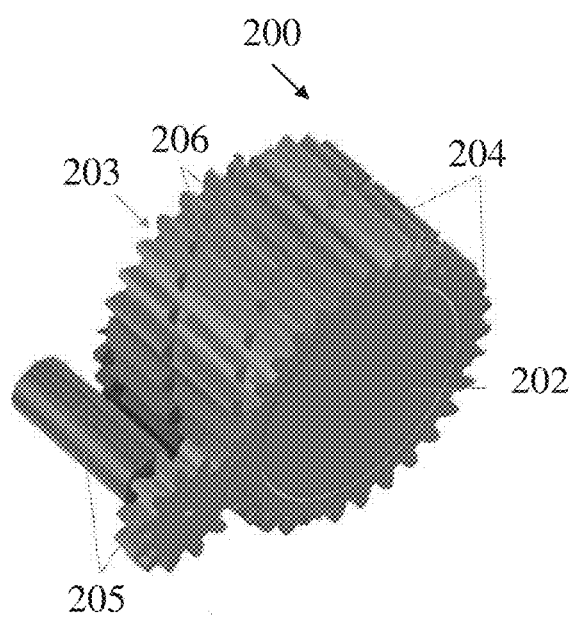
FIG. 2C is a perspective view of a portion of the adhesion magnet of FIG. 2A.

FIGS. 2A-2C depict one embodiment of an adhesion magnet 200 that may be included in a robot (such as robot 100 of FIG. 1) to provide an adjustable attractive magnetic force and maintain the robot in contact with a surface. In particular, the depicted embodiment includes a magnet 202 that is movable relative to a housing 201; FIG. 2A depicts the magnet 202 in a retracted position, and FIG. 2B depicts the magnet in an extended position. For example, the housing 201 may be mounted to a chassis of a robot, and moving the magnet 202 from the retracted position toward the extended position may decrease a distance between the magnet and the surface, thereby increasing the attractive magnetic force between the magnet and the surface. If the attractive magnetic force needs to be reduced, the magnet may be moved back toward the retracted position. In this embodiment, the magnet 202 comprises a permanent magnet, such as a neodymium magnet. The magnet may be formed as a single permanent magnetic member. Alternatively, in some instances, the magnet 202 may include an array of smaller magnets arranged to act as a single magnetic member. For instance, an array of magnets may be arranged in accordance with the Halbach array principle to increase a strength of the magnetic flux on one side of the magnet. Moreover, in some embodiments, the position(s) of one or more magnets in an array of magnets may be selectively controllable to adjust a strength of the overall magnet.

Figure 2D:
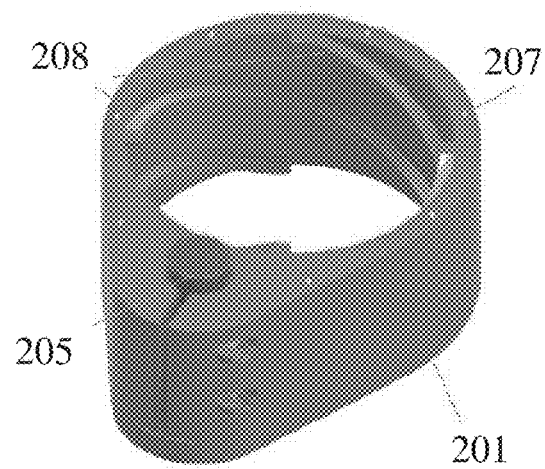
FIG. 2D is a perspective view of a housing portion of the adhesion magnet of FIG. 2A.

FIGS. 2C and 2D depict portions of the adhesion magnet 200 shown in FIGS. 2A-2B. As illustrated in FIG. 2C, the magnet 202 is located on a bottom surface of a cylindrical gear 203. In some embodiments, the gear 203 may be formed from a magnetic material, which may aid in increasing and guiding the magnetic flux from the magnet 202. The gear 203 includes a plurality of gear teeth 204 arranged to engage a drive gear 205 such that rotation of the drive motor and drive gear causes corresponding rotation of the gear 203. The gear 203 further includes one or more grooves 206 that engage corresponding threads 208 formed on an inner surface 207 of the housing 201, as shown in FIG. 2D. In this manner, rotation of the drive motor and drive gear 205 causes the cylindrical gear 203 (including the magnet 202) to translate in or out of the housing to move the magnet between the retracted position and the extended position. As discussed above, and as described in more detail below, the drive gear may be coupled to a controller (not depicted) to control movement of the magnet (e.g., in response to a change in force measured by a load sensor.)

Figure 3A:
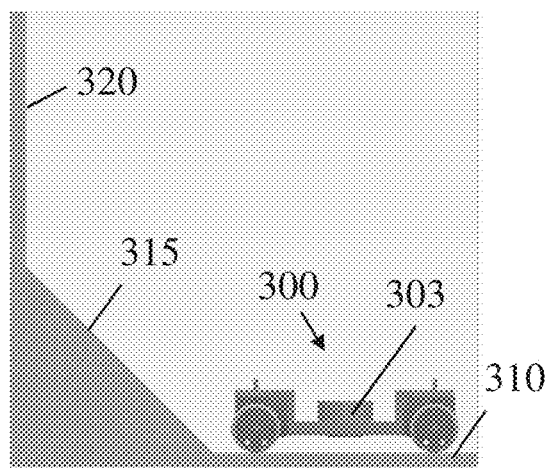
FIG. 3A is a side view of a robot on a horizontal surface, according to one embodiment.
Figure 3B:
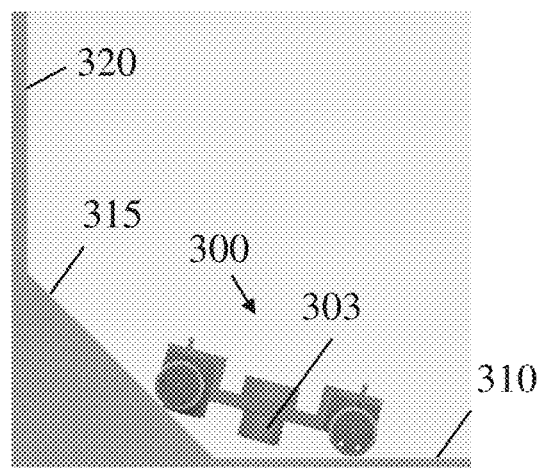
FIG. 3B is a side view of the robot of FIG. 3A moving onto an inclined surface.
Figure 3C:
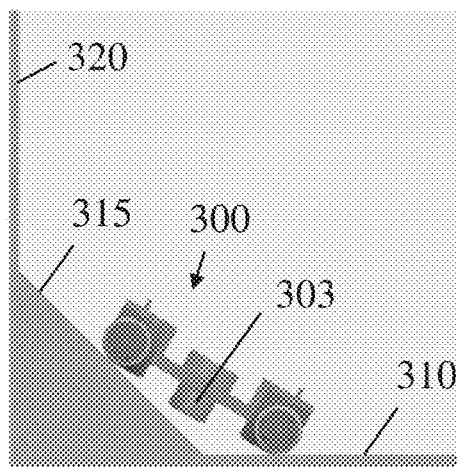
FIG. 3C is a side view of the robot of FIG. 3A moving further onto the inclined surface.
Figure 3D:
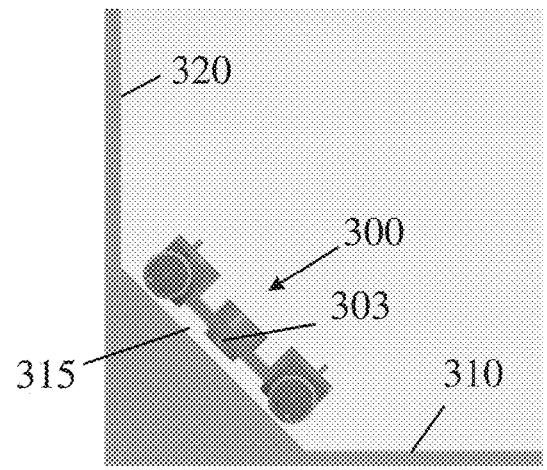
FIG. 3D is a side view of the robot of FIG. 3A on the inclined surface.
Figure 3E:
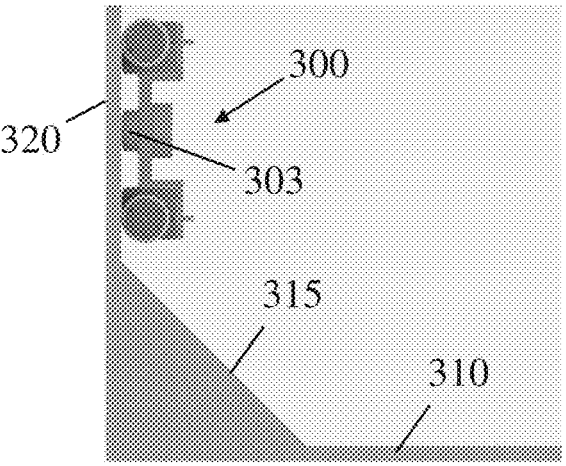
FIG. 3E is a side view of the robot of FIG. 3A on a vertical surface.

Referring now to FIGS. 3A-3E, operation of one embodiment of a robot 300 is described in more detail. In particular, FIGS. 3A-3E depict a robot moving from a horizontal surface 310 onto a vertical surface 320 via a ramp 315. The robot 300 includes one or more adhesion magnets 303 that are movable toward or away from the surfaces to adjust the attractive magnetic force between the robot and the surfaces. For example, as shown in FIG. 3A, the adhesion magnet may be retracted when the robot 300 is moving along the horizontal surface, and as the robot moves onto the ramp 315, the adhesion magnet may move toward an extended position to accommodate an increased distance between the robot and the surface resulting from the transition from the horizontal surface 310 to the ramp 315, as illustrated in FIGS. 3B-3C. Once the robot 300 is on the ramp 315 (FIG. 3D), the adhesion magnet may retract to an intermediate position to generate an attractive magnetic force sufficient to maintain the robot in contact with the ramp 315 while also permitting movement of the robot. Finally, when the robot moves onto the vertical surface 320, the adhesion magnet may move to an extended position to increase the attractive magnetic force and maintain the robot in contact with the surface.

Figure 4A:
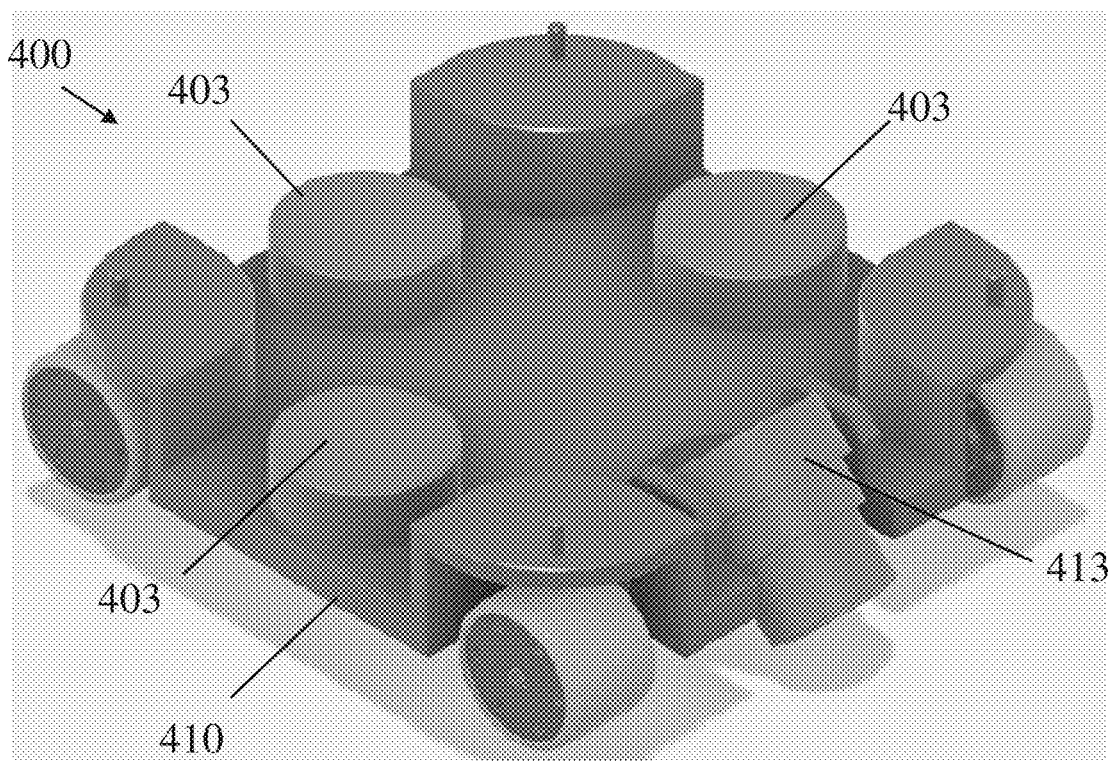
FIG. 4A is a perspective view of a robot including a rotatable adhesion magnet, according to one embodiment.
Figure 4B:
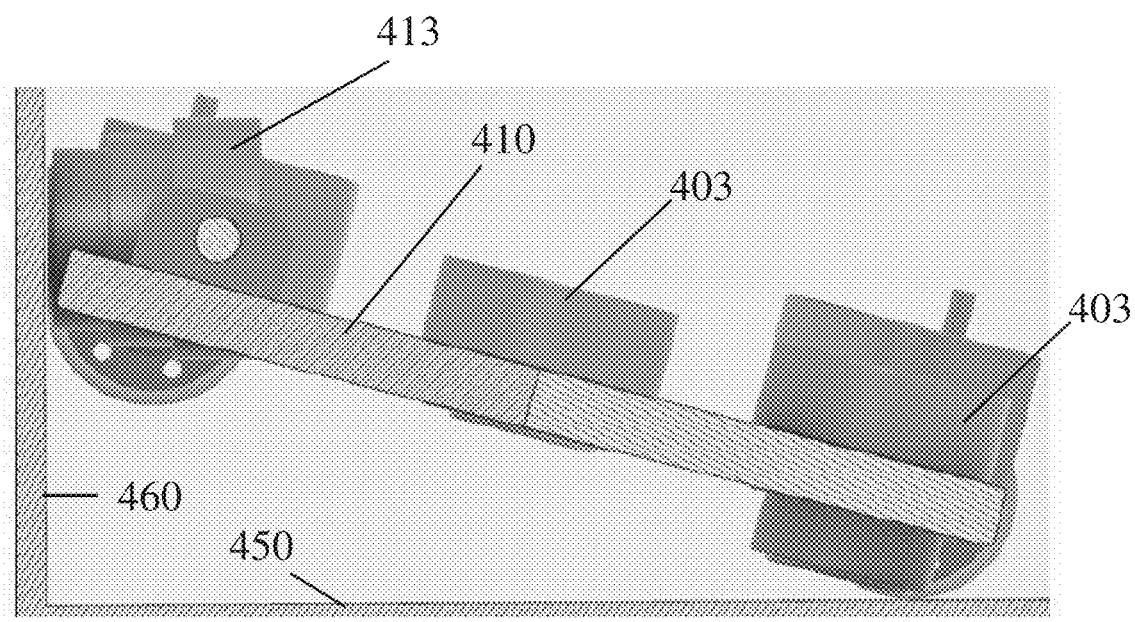
FIG. 4B is a cross-sectional side view of the robot of FIG. 4A moving between a horizontal surface and a vertical surface.

FIG. 4A depicts another embodiment of a robot 400 in which including a plurality of adhesion magnets 403 similar to those discussed above mounted on a chassis 410. In this embodiment, the robot further includes a rotatable adhesion magnet 413 that is rotatably mounted on the chassis 410. In addition to being extendable and retractable to adjust a strength of the attractive magnetic force, the rotatable adhesion magnet may be rotated relative to a surface to further adjust the strength of the attractive magnetic force. For example, FIG. 4B depicts the robot 400 moving between a horizontal surface 450 and a vertical surface 460. Without wishing to be bound by theory, the rotatable adhesion magnet may allow for the robot to transition between such abrupt changes in geometry in a surface while maintaining contact with the surface. While the depicted embodiment includes one rotatable adhesion magnet, it should be understood that any number of the adhesion magnets 403 may be similarly rotatably mounted to the chassis, as the current disclosure is not limited to any particular number, arrangement and/or combination of rotatable and non-rotatable adhesion magnets. In some instances, such rotatable adhesion magnets may be rotatable about multiple axes, for example, if coupled to a robot via a suitable coupler such as with Hudson bearings. Moreover, depending on the particular embodiment, the rotatable adhesion magnets may be passively rotatable such that the rotation of the adhesion magnets varies based on changes in the orientation of the surface on which the robot is moving, or the rotation may be actively driven and controlled by an associated controller to achieve a desired change in the attractive magnetic force.

Figure 5A:
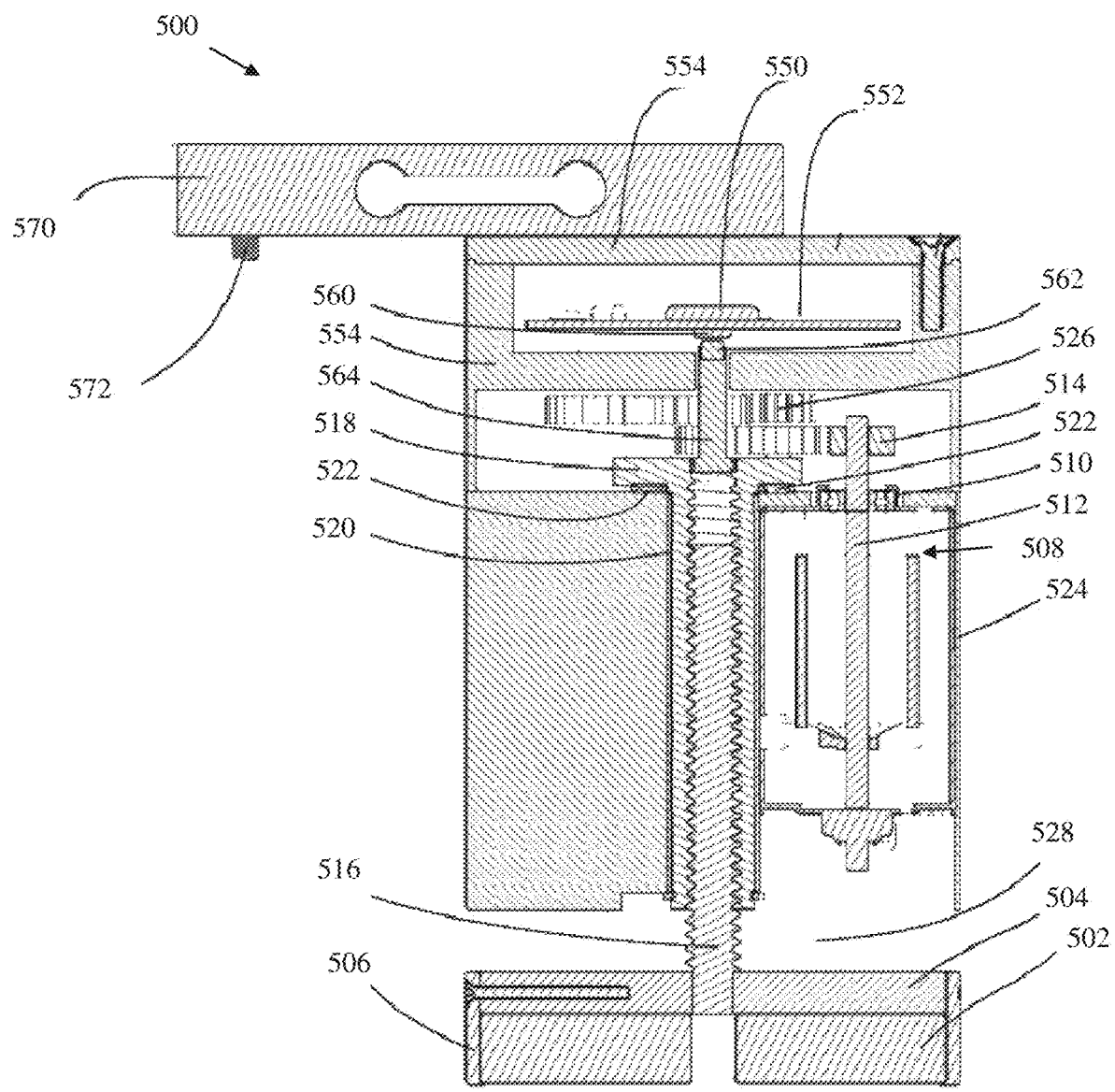
FIG. 5A is a cross-sectional view of an adhesion magnet, according to one embodiment.
Figure 5B:
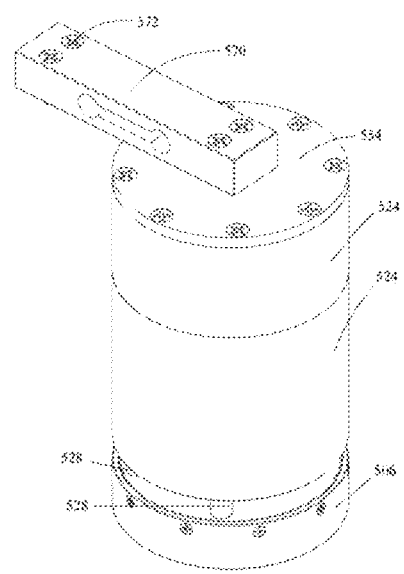
FIG. 5B is a perspective view of the adhesion magnet of FIG. 5A.
Figure 5C:
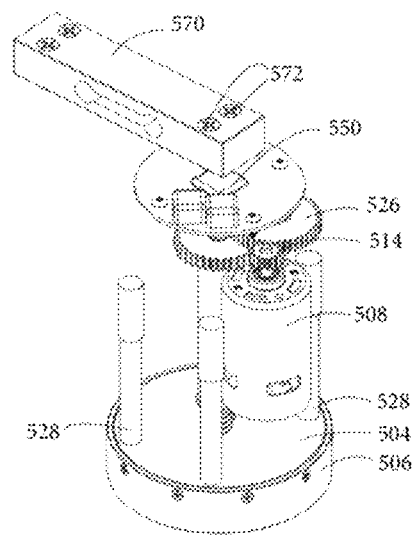
FIG. 5C is a partial interior view of the adhesion magnet of FIG. 5A.

FIGS. 5A-5C depict another embodiment of an adhesion magnet 500. In this embodiment, a magnet 502 is attached to a movable platform 504 via a magnet retainer 506. In some embodiments, the magnet 502 may be removable from the magnet retainer 506, e.g., for maintenance and/or replacement of the magnet 502. For example, the magnet may be replaceable in case the magnet becomes damaged and/or if a stronger or weaker magnet is desirable in certain applications. The movable platform is coupled to a motor 508 (e.g., a DC motor including a starter, 510, a rotor 512, and a driving gear 514) via a drive screw 516 that is received in a drive nut 518. In the depicted embodiment, a bushing 520 is provided around the drive nut 518, and a thrust bearing 522 is positioned between the drive nut 518 and a housing 524 of the adhesion magnet. The motor 508 is coupled to the drive nut 518 via a transmission 526 including one or more gears such that the motor can drive rotation of the drive nut 518, which leads to linear movement of the drive screw 516, and correspondingly the magnet 502, toward or away from the housing 524. As illustrated, the adhesion magnet 500 includes guide rails 528 to aid in maintaining the alignment of the magnet 502 and drive screw 516 as the magnet is translated.

In some embodiments, the drive screw 516 and drive nut 518 may be configured to automatically allow movement of the magnet toward and possibly into contact with a surface in the event of a power failure experienced by the adhesion magnet 500. For example, the lead screw may have a sufficiently large lead selected such that the magnet 502 may automatically be brought close to or into contact with an underlying surface via an attractive magnetic force between the magnet and the surface if the adhesion magnet loses power. Such arrangements may be beneficial to ensure that the adhesion magnet 500 moves to a configuration exhibiting the a sufficiently attractive magnetic force (e.g., as close as possible to the surface) to securely hold a robot in place using the adhesion magnet on the surface until maintenance can be performed.

FIGS. 5A and 5C also depicts a controller 550 that may be included to control movement of the magnet 502 to adjust the attractive magnetic force generated by the adhesion magnet 500. For example, the controller 550 may include a printed circuit board 552 received in a controller housing 554 formed in the housing 524. The controller may be configured to control operation of the motor, such as controlling the speed of the motor and the direction of rotation of the motor to move the magnet 502 to a desired position. In some embodiments, the adhesion magnet 500 may include a sensor such as a magnetic encoder 560 coupled to the controller 550. A magnet 562 of the magnet encoder may be attached to a holder 564 coupled to the drive nut 518. In this manner, rotation of the drive nut, corresponding to linear translation of the magnet 502, may be monitored using the magnetic encoder 560.

The embodiment depicted in FIGS. 5A-5C further includes a load sensor 570 coupled to the adhesion magnet 500, and the adhesion magnet may be attached to a robot via one or more mounting screws (or other suitable fasteners) 572 attached to the load sensor. Such a configuration may allow the load sensor 570 to directly measure a net force between the adhesion magnet and a surface.

In some instances, the adhesion magnet 500 of FIGS. 5A-5C may be controlled based on a feedback control system using two feedback control loops. One feedback loop may be implemented with input from one or more load sensors such as the load sensor 570 coupled to the adhesion magnet and/or one or more load sensors coupled to a locomotion system of a robot (e.g., load sensors positioned on axles of wheels of the robot). These load sensors may continuously measure a force value (or an associated pressure or strain value) applied between a robot and the surface on which the robot moves. Input from the load sensors may be converted to a digital value using a suitable analog-to-digital converter (ADC), such as an ADC designed for use with weighing scales or other similar applications. Based on the input from the load sensors, a first control effort is calculated and is transmitted as a control signal for the controller 550 of adhesion magnet 500.

A second feedback control loop is based on the data from magnetic encoder 560 as a sensor of the actual position of the magnet 502. A second control effort is calculated based on the position data from the magnetic encoder and the second control effort is transmitted to the corresponding driver of the motor 508. Based on the first control effort corresponding to the measured force value, the second control effort based on the measured position of the magnet, as well as a known magnetic force vs. distance to a surface relationship for given magnet and a given magnetic surface, the control system can calculate the position of the magnet needed to provide a required attractive magnetic force. In some instances, the second feedback loop may be much faster but less accurate then first feedback control loop, and so it may be continuously corrected by the first feedback control loop.

Figure 11:
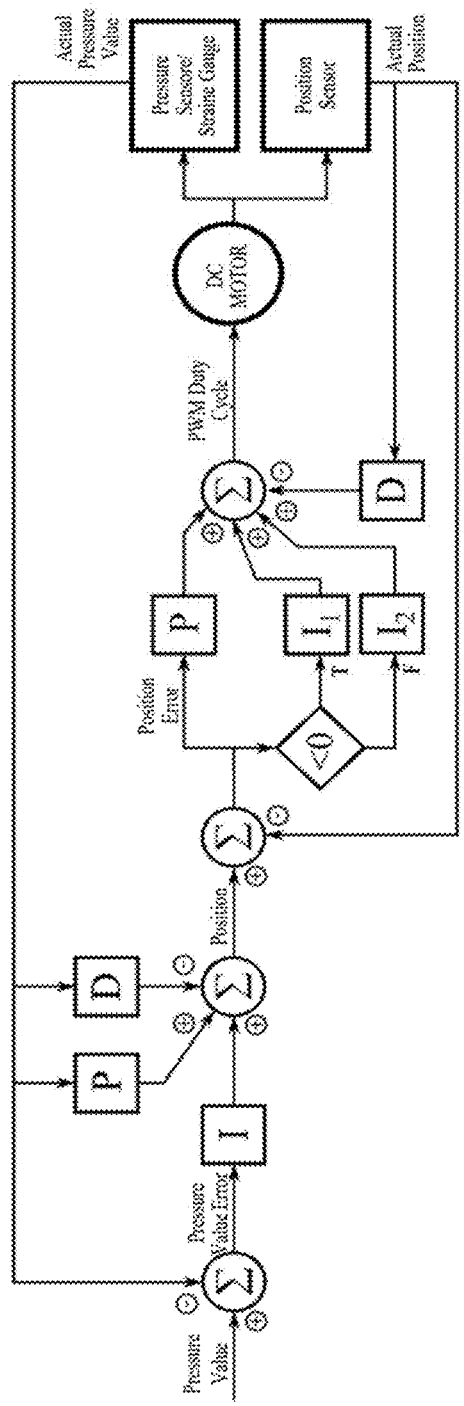
FIG. 11 is a flow chart depicting a control scheme for an adhesion magnet, according to one embodiment.

In some embodiments, the above-described control scheme may be implemented with two PID controllers (with two sets of PID parameters): a first to control the raising of magnet 502 (to reduce the attractive magnetic force), and a second to control lowering the magnet (to increase the attractive magnetic force). A schematic of an exemplary control scheme is shown in FIG. 11. The PID parameters for the first PID controller may be set as so to eliminate "over regulation," which is when the process value "jumps over" the setpoint, and then returns to the setpoint, often not at once but with several such "jumps". As a result, this controller raises the magnet more slowly to the desired position than may be required by the robot to maintain adhesion, but these delays may simply lead to a slightly higher energy consumption for a short time, such as few milliseconds, until the desired setpoint is reached. In contrast, the PID parameters for the second PID controller may be selected to ensure that the required attractive magnetic force is achieved as quickly as possible, despite possible overregulation.

In one exemplary embodiment, the above described control loops may be implemented with a 24 bit ADC using an amplification of 128×, and a sample rate for the load sensor may be about 80 samples per second. To keep the influence rate of the controller stable, the control effort for first loop may be calculated about every 14 milliseconds (i.e., about 70 Hz). In some instances, the adhesion magnet 500 may be configured to move the magnet 502 at a maximum speed of about 50 mm per second. Accordingly, a correction may be applied for every 0.7 mm of movement of the magnet. Additionally, the second feedback control loop may operate at a frequency at least ten times larger than the frequency of the first loop. For example, the second feedback loop may calculate the second control effort value at a frequency of about 1000 Hz, corresponding to every 0.05 mm of movement of the magnet 502 when the magnet is moving at maximum speed.

Figure 6:
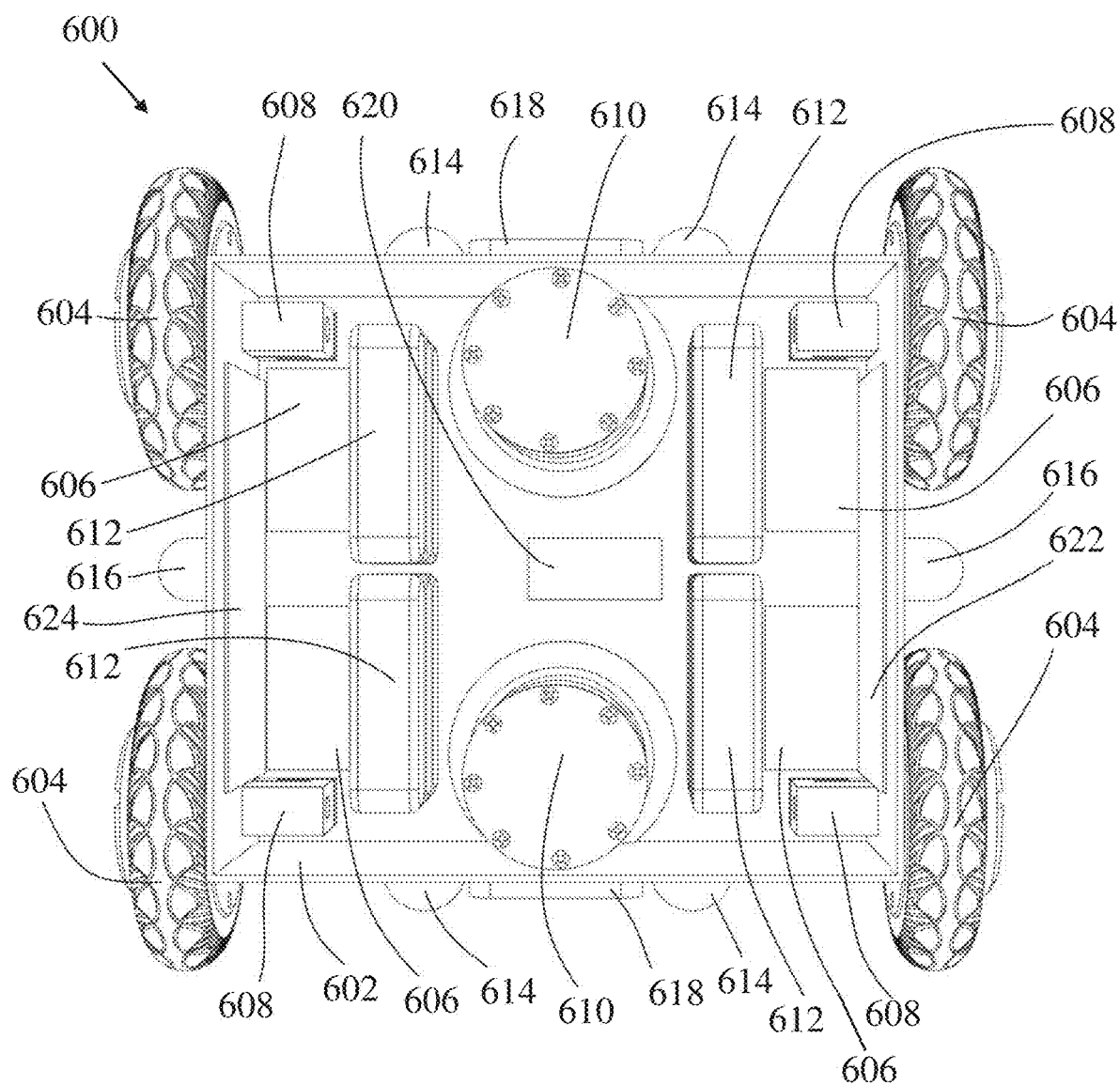
FIG. 6 is a top interior view of a robot, according to one embodiment.

Referring now to FIG. 6, a partial top view of another embodiment of a robot 600 is described in more detail. In this embodiment, the robot includes a chassis 602 on which four wheels 604 are mounted to permit movement of the robot along a surface. Each wheel is driven by an associated drive system 606, such as a motor; however, it should be understood that other arrangements may be suitable, such as robots in which only a subset of the wheels are driven, or in which a single drive system is arranged to drive more than one wheel. A load sensor 608 is coupled to an axle of each wheel where the wheels are attached to the chassis 602. As discussed previously, this configuration may allow the load sensors to directly measure the net force acting between the wheels of the robot and the surface to which the robot is adhered. Similar to the embodiments described above, the robot 600 includes adjustable adhesion magnets 610 to adhere the robot to the surface via an attractive magnetic force, which may be adjusted based on the force values measured by the load sensors. The robot further includes one or more power units such as batteries 612 to provide power to the various systems on the robot.

The robot 600 further includes a variety of sensors which may assist with one or more tasks that the robot may perform, such as when the robot is utilized in an AS/RS to transport payloads. For example, the robot 600 may include obstacle detection sensors 614 and 618 such as time of flight (TOF) sensors, Lidar sensors, and/or ultrasonic sensors configured to detect obstacles in the path of the robot, and the wheels (or other suitable drive or locomotion systems) may adjust a path of the robot to avoid any detected obstacles. Additionally, the robot may include one or more sensors to track the location and/or position of the robot along a surface. For example, linear motion sensors 616 may be utilized to track movement of the robot along the surface. Alternatively or additionally, a surface on which a robot moves may include a plurality of location codes readable by a scanner 620 on the robot 600. For example, the location codes may include 2D codes or other suitable machine-readable codes, and the scanner may include a camera or other suitable code reader configured to scan the codes and determine the location of the robot based on a scanned code.

The robot 600 may include one or more controllers, such as a motion control unit 622 configured to control aspects related to movement of the robot (e.g., via the wheels 604 and associated driver systems 606) and/or adhesion of the robot to a surface via the adhesion magnets. For instance, the motion control unit may differentially drive one or more of the wheels to provide for steering control of the robot. In some embodiments, a central control unit 624 may be included that may coordinate input and control signals between the various sensors and drivers. Moreover, in some instances, the central control unit on the robot may communicate with a centralized controller of a larger system such as an AS/RS, which may coordinate control of multiple robots.

Figure 7A:
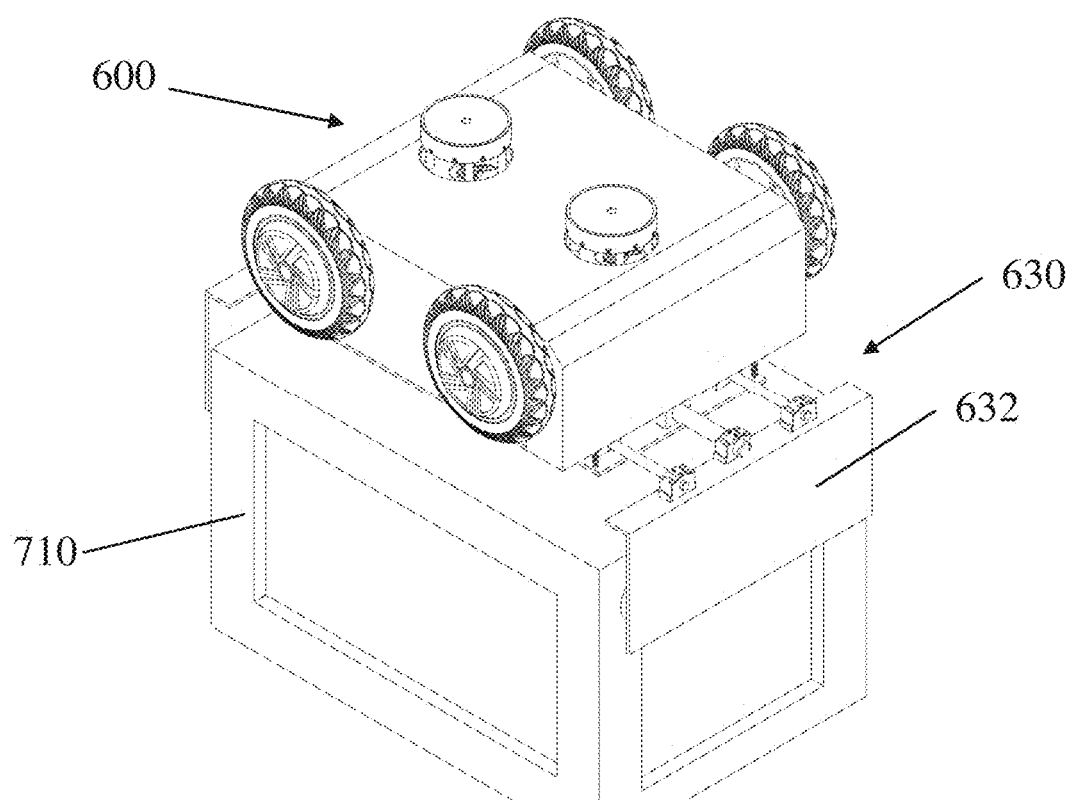
FIG. 7A is a perspective view of a robot carrying a payload, according to one embodiment.
Figure 7B:
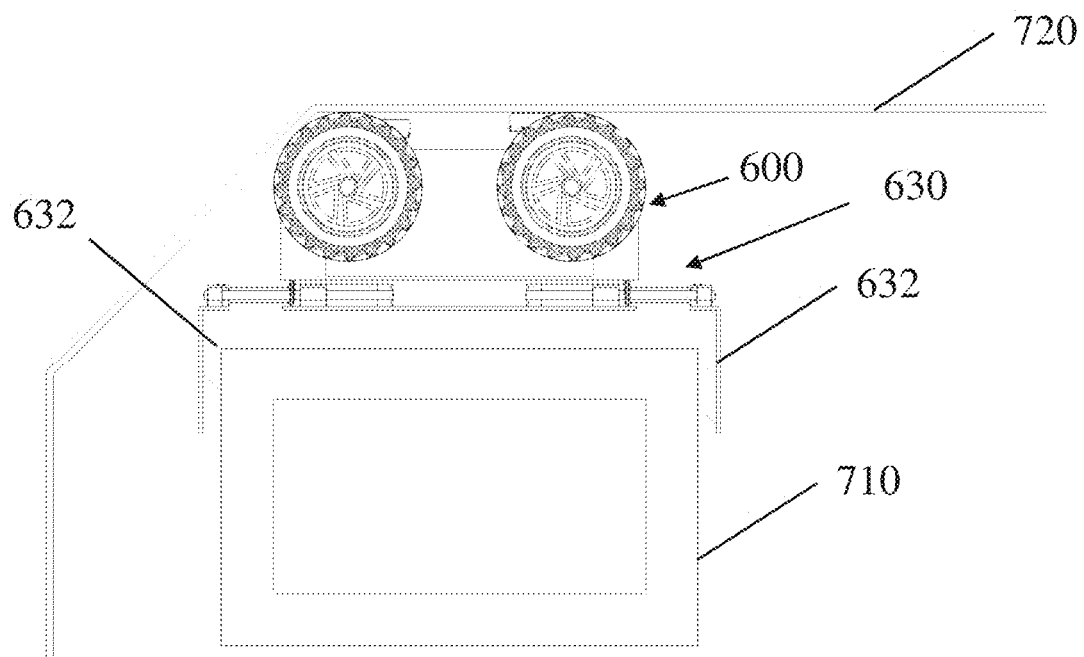
FIG. 7B is a side view of the robot of FIG. 7A moving along a downwardly-facing surface.

FIGS. 7A-7B, depict the robot 600 of FIG. 6 transporting a payload 710 along a downwardly facing surface 720 (for clarity, the surface is not depicted in FIG. 7A). The payload 710 is secured to the robot 600 by a gripper 630, which in this embodiment, defines a retainer of the robot. The gripper includes a pair of retaining elements 632 that contact opposing sides of the payload 710 to secure the payload. In some instances, the retaining elements may be extendable and/or retractable relative to the robot to accommodate different sized payloads and/or to allow adjustment of a gripping force applied by the retaining elements.

Referring now to FIGS. 8A-10, various aspects of an exemplary AS/RS utilizing one or more of the robots described herein are described in more detail. FIG. 8A depicts an AS/RS 800 including a storage structure having a plurality of levels 802. A plurality of objects (not depicted) may be stored at storage locations on the various levels 802 of the storage structure. Each level includes a floor 804 and a ceiling 806; for example an underside of a floor of one level may define a ceiling of the underlying level. The storage structure includes a plurality of ramps 808 that connect the floors/ceilings of adjacent levels. Additionally, the storage structure may include one or more vertical walls 810 connecting one or more levels, and wall connecting ramps 812 may connect the floors/ceilings of the levels 802 to the walls 810. One or more robots 820 may be movable along the floors 804, ceilings 806, ramps 808, walls 810 and/or wall connecting ramps 812 to transport objects throughout the storage system. In particular, at least the ceilings 806, ramps 808, walls 810 and/or wall connecting ramps 812 may comprise a magnetic material such that the robots 820 may adhere to the various surfaces via an attractive magnetic force as discussed above. In some embodiments, the floors 802 also may include a magnetic material.

Figure 8B:
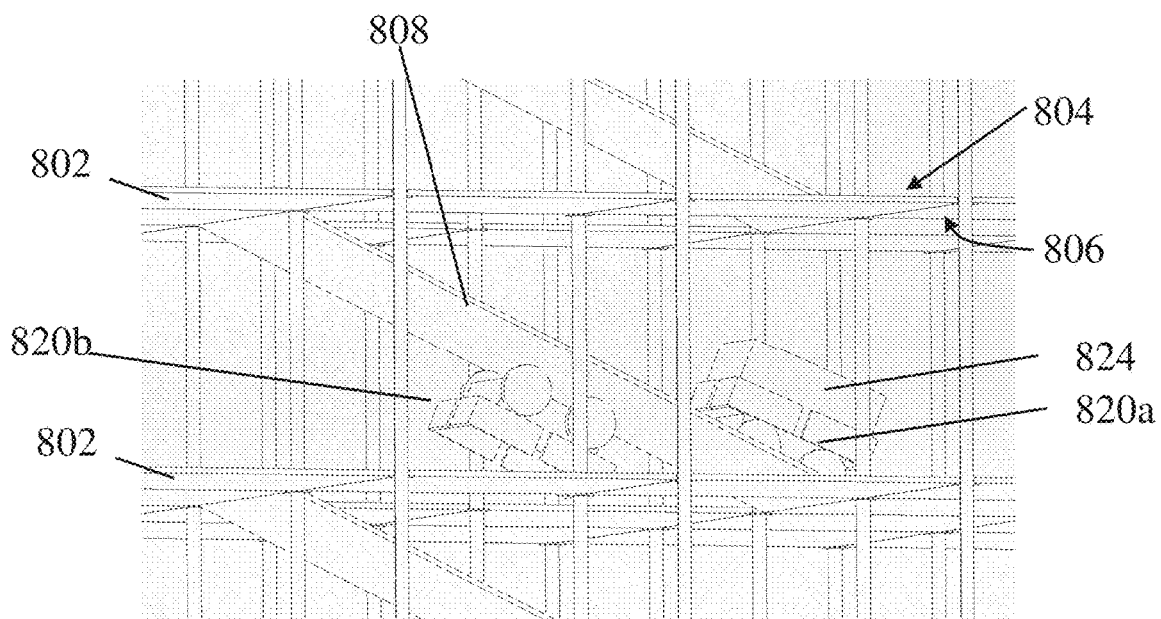
FIG. 8B is a perspective view of a portion of the automated storage and retrieval system of FIG. 8A.

FIG. 8B depicts a portion of the AS/RS 800 shown in FIG. 8A including two robots 820 traveling along ramps 808 between levels of the storage structure. In particular, a first robot 820a is traveling between floors 804 of adjacent levels along a partially upwardly facing surface of a ramp 808, and that robot is transporting a payload 824. A second robot 820b is traveling between ceilings 806 of the adjacent levels, and that robot is traveling along a partially downwardly facing surface of the ramp. The robot 820b maintains contact with the ramp via an attractive magnetic force between one or more adhesion magnets on the robot and the surface of the ramp.

Figure 9:
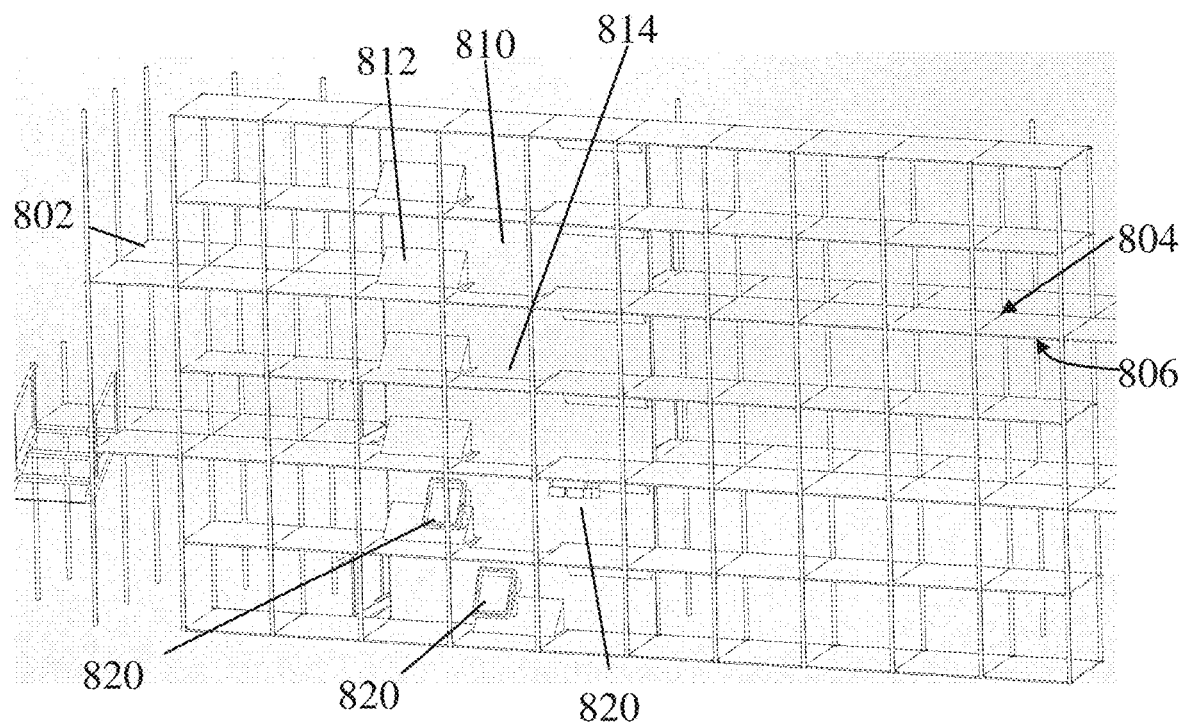
FIG. 9 is a perspective view of a portion of an automated storage and retrieval system, according to one embodiment.

FIG. 9 depicts a portion of an AS/RS including walls 810 extending between a plurality of levels 802 of a storage structure. Such an arrangement may be beneficial to allow robots 820 to quickly move between multiple levels of the storage structure. For example, the robots 820 may move from a floor 804 or a ceiling 806 of a particular level 802 onto the walls 810 via wall connecting ramps 812. Moreover, the levels 802 may include openings 814 to permit the robots 820 to move between the levels along the walls 810.

While ramp structures have been described above to permit movement of the robots between levels of a storage system, it should be understood that alternative and/or additional arrangements to move the robots between levels may be employed in some embodiments. For example, and AS/RS may include one or more lift or rail structures to permit movement of the robots between levels.

Figure 10:
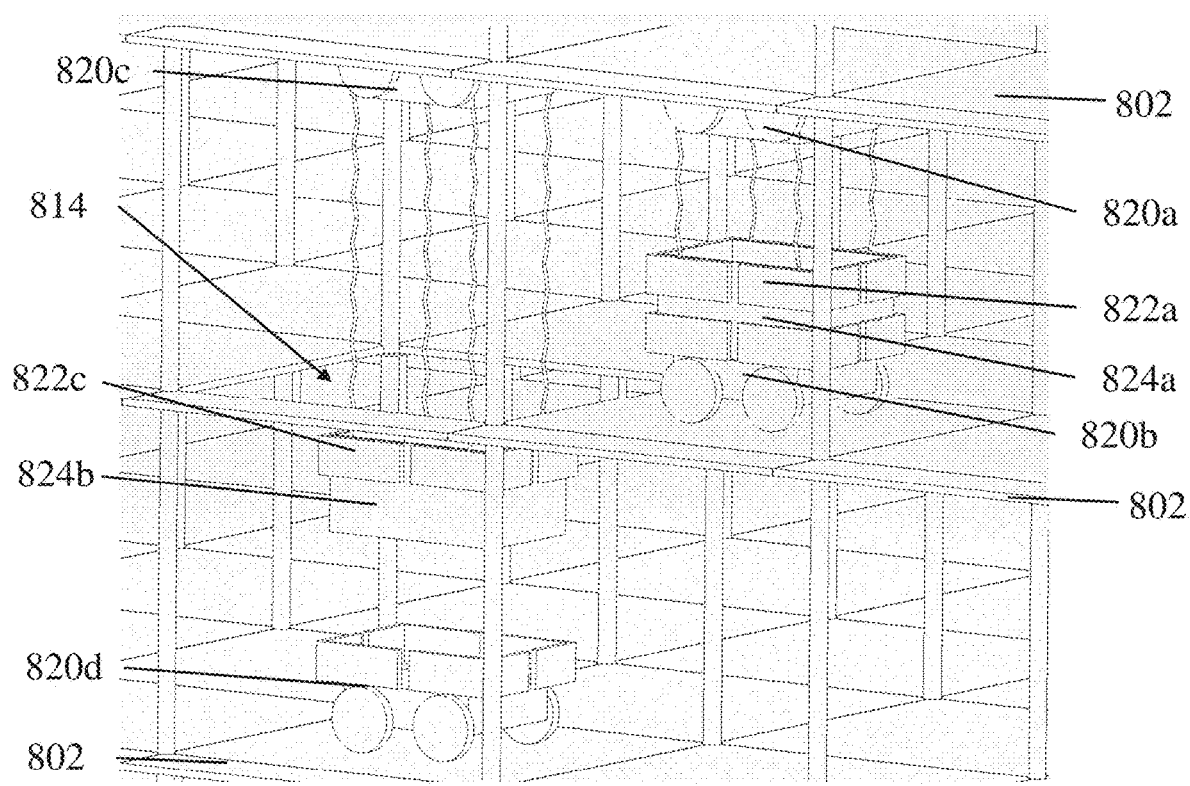
FIG. 10 is a perspective view of a portion of an automated storage and retrieval system, according to another embodiment.

FIG. 10 depicts a portion of an AS/RS including first robots 820a and 820c traveling on a ceiling of a level 802, as well as second robots 820b and 820d traveling along floors of underlying levels. As illustrated, each of the first robots 820a and 820c includes a gripper 822a and 822c, respectively, to move a payload 824a or 824b between the first robots and the second robots. In particular, the grippers may be configured to grab a payload from an underlying robot to move the payload to a higher level of the storage structure, and/or to release a payload onto the underlying robot to move the payload to a lower level of the storage structure. Moreover, in some instances, the storage structure may include openings 814 such that the robots may transport a payload across multiple levels.

In some embodiments, the operations within the AS/RS may be managed by a central control system that provides a teamwork or swarm-like collaboration of the robots. For example, the central control system may determine an appropriate sequence of operations for the robots, coordinate storage locations of objects or items to be picked up or to be delivered within a storage structure, and/or provide traffic control and itinerary planning for the robots. The central control system may optimize movement of the robots such as by attempting to minimize the travel distance of each robot between the storage locations, and/or by balancing the location of objects in the system based on an expected frequency of access, (e.g., less popular objects may be placed in the farthest locations requiring the largest travel distances).

In view of the above, it should be understood that one or more of robots may serve as delivery vehicles within a storage structure of an AS/RS. The robots may have an on-board controller to control various operations of the robots, and the robots may communicate with a central control system to coordinate the operations of multiple robots. Each robot may include any suitable grippers, manipulators, actuators, and/or holding or retrieving tooling to perform a particular task. Moreover, a single system there can include multiple types of robots different types of such grippers, manipulators or other tooling. For example, some robots may be configured to pick up objects from a storage location and place the objects on other robots that may transport the objects throughout the storage system. While embodiments have been described above including robots having adhesive magnets to adhere to a surface, it should be understood that a system may include a combination of various types of robots, including some robots that do not include such magnetic adhesion arrangements. For example, a system may include one or more automated mobile robots configured to travel only along upwardly facing surfaces of the system such that those robots do not require any magnetic adhesion.

According to some aspects, the inventors have appreciated that the AS/RSs described herein may provide a high degree of adaptability, for example, to accommodate changing business needs and requirements. These systems may allow for the possibility of optimizing the configuration of a given AS/RS construction for required bandwidth and holding capacity (e.g., based on a number of objects held in a storage structure). For example, a given AS/RS may initially accommodate 100,000 different objects and four robots for very low bandwidth, but later may be re-configured for holding of 50,000 different objects and may utilize 200 robots operating simultaneously for very high bandwidth applications. Unlike many conventional AS/RSs where guides or rails are used or where surface area is defined by the footprint of the facility (square footage), the storage and bandwidth capacities of the AS/RSs described herein are limited by the volume of a facility (cubic footage) and can be easily changed by software configurations and variation of the number of robots and objects in the system, without requiring any change in physical construction of the system.

Moreover, the AS/RSs described herein may be adaptable in response to changing needs during a single day of operation, such as based on changes in required storage, retrieval, and/or sorting tasks that may be performed by the robots in an AS/RS. Such tasks can be effectively distributed based on the available number of operators and robots. The centralized control system may be responsible for the distribution of tasks between robots as well as between human operators of the AS/RS based on their availability at a given moment.

In addition to the above, the inventors have appreciated numerous advantages associated with the three-dimensional nature of the systems described herein. For example, some embodiments may allow for high adjustability of bandwidth and performance for a given storage structure configuration and/or number of objects stored therein. In particular, this adjustability result from the ability of the robots to travel independently of each other between all surfaces and levels of the storage structure, thus allowing for a large density of robots to operate on the storage structure without experience congestions or jams. For example, at many points of an AS/RS, a control algorithm of a robot driving may choose to move the robot along a floor surface, along a ceiling, or onto a wall surface and continue moving in any of four directions within a chosen surface. Such versatility of the driving capabilities of the robots may provide substantial flexibility with respect to traffic organization techniques to allow for high performance for the system (e.g., high throughput of objects transported throughout the system) even when the individual robots may have limited maximum movement speeds.

In addition to the above, the inventors have recognized and appreciated that systems described herein may allow for reconfiguration of the system without requiring the entire system to be taken offline. For example, the ability of the robots to move independently throughout the system may allow for portions of a system to be reconfigured (e.g., expanded to provide increased storage capacity) without interruption to other portions of the system. Moreover, such arrangements may provide for systems that are highly adaptable to a failure of one or more components. For example, if a single robot fails, other robots may be reconfigured to perform the tasks assigned to that robot. As another example, if a portion of storage system is at risk of failure (and therefore at risk of becoming unavailable), one or more robots may be tasked with moving the objects stored in that portion to a different portion of the storage system.

Figure 12:
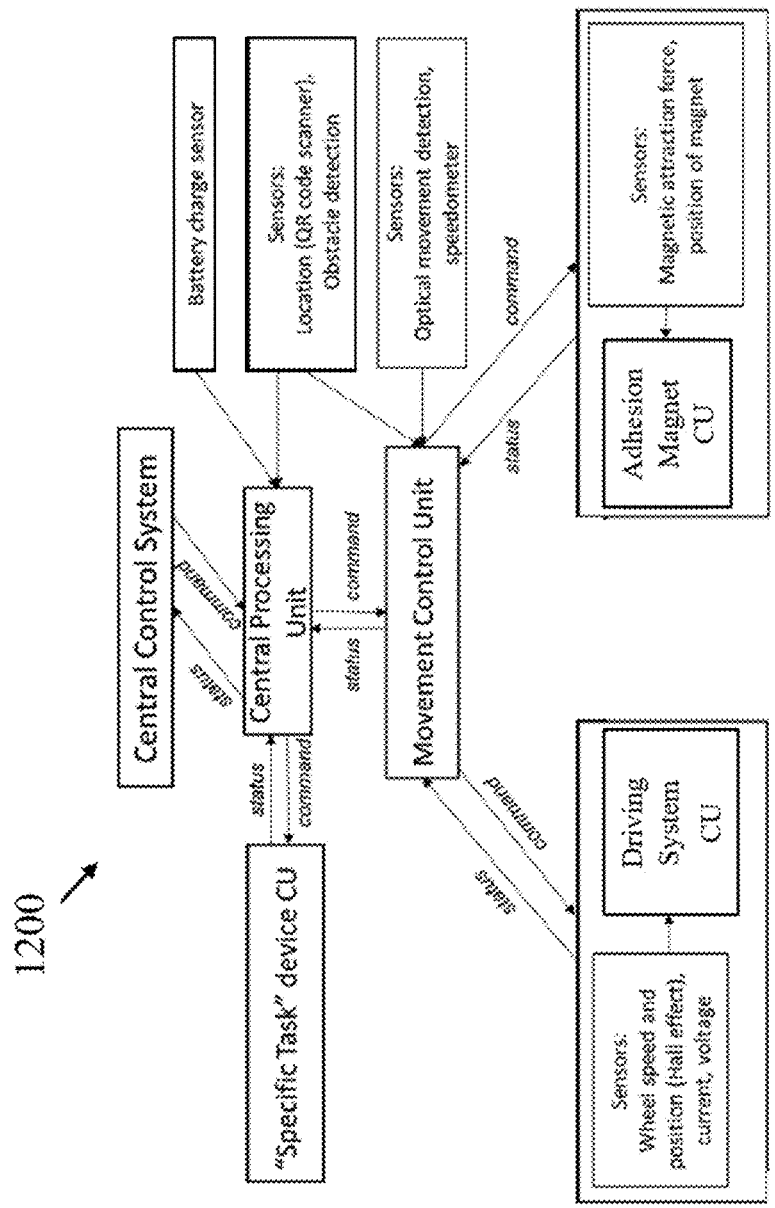
FIG. 12 is a block diagram of a control system, according to one embodiment.

Referring now to FIG. 12, one embodiment of a control system 1200 that may be used to control one or more aspects of the system described herein is described in more detail. The control system may include multiple modules, such as central processing unit, a movement control unit, an adhesion magnet control unit, and a driving system control unit.

For example, as discussed above, the adhesion magnet control unit may control one or more adhesion magnets based on sensor input, such as from one or more load cells, to ensure that a sufficient attractive magnetic force is maintained to keep the robot in contact with a surface, while still permitting movement of the robot along the surface. In particular, some embodiments may use substantially continuously measure a force or strain on each wheel of a robot to determine the net force acting on the robot. These sensors may transmit data to a corresponding controller of the adhesion magnet to provide an appropriate adjustment to the attractive force. In this manner, these systems may work in real-time, to enable the robot to remain attached to the surface while moving, changing its orientation or picking a payload. In some applications, this arrangement also may enable the robot to measure a weight of a payload held by the robot. Further, some embodiments may include a sensor to monitor a position of a magnet in an adhesion magnet to provide additional input to control the attractive magnetic force.

The driving system control unit may receive commands such as navigation commands from a movement control unit. Based on the navigation commands, the driving system control unit may send control signals to one or more drive units associated with a locomotion system, such as motors coupled to one or more wheels. In some embodiments, such motorized wheels may include one or more sensors that monitor the speed and position of wheels (e.g., via Hall effect sensors that are placed on each wheel.

The movement control unit may perform one or more high level tasks, such as management and/or control of the adhesion magnet control units and/or driving system control units. Additional tasks may include navigation and collision avoidance based on input from one or more location sensors and/or obstacle sensors.

In some embodiments, machine readable codes such as 2D codes may be used as optical beacons for mapping an environment on which a robot moves, such as a storage structure of an AS/RS. The codes may be placed on magnetic surfaces, obstacles, other robots, items of payload, and so on, to allow for navigation. Once read by a suitable sensor on a robot, the codes provide the robot with information about the surface spatial orientation, its magnetic properties, and/or its location within a structure.

The movement control unit may further communicate with one or more obstacle sensors, which may be configured to detect objects located in directions in which a robot is capable of moving. The obstacle sensor may use any appropriate components and techniques, including optical, radar, sonar, pressure-sensing and other types of detection devices appropriate to detect objects located in the direction of travel of the robot. If an obstacle is detected the sensor may transmit an appropriate signal to the movement control unit such that appropriate remedial actions may be implemented to prevent a collision.

Tasks that may be performed by the central processing unit include, maintaining of given local system (local environment), route planning, e.g., to compute a robot's itinerary in the given local system, re-creating local system map and constantly comparing it with a preset map, providing high-level management the tasks for one or more robots, avoiding collisions, tracking a power level of one or more batteries within a robot, and communicating with a central control system. The central control system, which may be remote from each robot in a system, may perform one or more high level tasks such as traffic control, performance monitoring, and optimization. The central control system may send signals to individual robots related to specific tasks to be performed by the different robots, such as managing payloads to be picked up or dropped off at different locations within a storage structure.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a controller may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a controller may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such controller may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, some methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that one or more computer programs that when executed perform methods of the present disclosure, need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Accordingly, the foregoing description and drawings are by way of example only.

What is claimed is:

1. A robot for transporting a payload, the robot comprising:
   a locomotion system configured to permit the robot to move along a surface;
   a retainer constructed and arranged to hold a payload;
   one or more adhesion magnets constructed and arranged to adhere the robot to the surface via an attractive magnetic force, wherein a first adhesion magnet of the one or more adhesion magnets is movable relative to the surface to adjust the magnitude of the attractive magnetic force;
   a load sensor; and
   a controller configured to adjust a magnitude of the attractive magnetic force in response to a change in a force measured by the load sensor.

2. The robot of claim 1, wherein the locomotion system comprises at least one selected from the group of wheels, sliders, rails, treads, tracks, and legs.

3. The robot of claim 2, wherein the robot is suspendable from a downwardly-facing surface via the attractive magnetic force.

4. The robot of claim 2, further comprising a location sensor configured to determine a location of the robot.

5. The robot of claim 2, wherein the one or more adhesion magnets comprise at least one selected from the group of a permanent magnet and an electromagnet.

6. The robot of claim 2, further comprising a handler configured to retrieve the payload from a storage location.

7. The robot of claim 1, wherein the controller is configured to calculate an adjustment amount to the attractive magnetic force in response to a change in a force measured by the load sensor.

8. A robot for transporting a payload, the robot comprising:
   a retainer constructed and arranged to hold a payload;
   a drive system comprising one or more wheels coupled to the robot, the drive system being configured to move the robotic system along a surface;
   one or more adhesion magnets constructed and arranged to adhere the robot to the surface via an attractive magnetic force;
   one or more load sensors configured to detect a force between the surface and robot; and
   an adhesion magnet actuator configured to move a first adhesion magnet of the one or more adhesion magnets relative to the surface to adjust a magnitude of the attractive magnetic force in response to a change in the force detected by the one or more load sensors.

9. The robot of claim 8, further comprising a controller operatively coupled to the one or more load sensors and the adhesion magnet actuator, wherein the controller is configured to actuate the adhesion magnet actuator in response to a change in the force detected by the one or more load sensors.

10. A method of operating a robot on a downwardly-facing surface or a wall surface, the robot including a load sensor, a locomotion system, and one or more adhesion magnets to apply a magnetic attraction force between the robot and the downwardly-facing surface, the method comprising:
   (a) receiving a force measurement from each of one or more load sensors when the robot is suspended from the downwardly-facing surface and holding a payload;
   (b) adjusting a magnitude of an attractive magnetic force between the robot and the downwardly-facing surface by moving a first adhesion magnet of the one or more adhesion magnets relative to the surface based at least in part on the force measurement(s) to maintain a net force between the robot and the downwardly-facing surface which is sufficient to maintain contact between the robot and the downwardly-facing surface; and
   (c) moving the robot along the surface.

11. The method of claim 10, wherein act (b) is performed while the robot moves along the downwardly-facing surface or the wall surface.

12. The method of claim 10, further comprising measuring the net force.

13. The method of claim 12, further comprising determining an adjustment to the magnitude of the attractive magnetic force using the measured net force.

14. The method of claim 10, wherein act (c) comprises moving the robot along the downwardly-facing surface or the wall surface with the robot holding the payload.

15. The method of claim 10, wherein act (a) comprises receiving a force measurement from a load sensor configured to determine a force on the robot from the weight of the payload.

16. A method of operating a robot on a surface, the robot having one or more adhesion magnets to apply a magnetic attraction force between the robot and the surface, the method comprising;
 (a) measuring a net force between a robot and surface;
 (b) using a controller to determine whether to adjust the net force;
 (c) adjusting the magnetic attraction force between the robot and the surface based on the controller's determination, wherein adjusting the magnetic attraction force comprises moving a first adhesion magnet of the one or more adhesion magnets relative to the surface; and
 (d) moving the robot along the surface.

17. The method of claim 16, wherein act (d) comprises transporting a payload with the robot.

18. The method of claim 16, wherein the one or more adhesion magnets comprises an electromagnet, and adjusting the magnetic attraction force comprises adjusting an electrical current supplied to the electromagnet.

19. The method of claim 16, wherein:
 a first adhesion magnet of the one or more adhesion magnets comprises a plurality of permanent magnets that are arranged in an array in such that adjustment of the positions of the permanent magnets relative to each other changes the magnetic flux on a side of the first adhesion magnet; and
 act (c) comprises adjusting the positions of the permanent magnets within the array.

20. A method of operating a robot on a surface, the robot having one or more adhesion magnets to apply a magnetic attraction force between the robot and the surface, a first adhesion magnet of the one or more adhesion magnets comprises a plurality of permanent magnets that are arranged in an array in such that adjustment of the positions of the permanent magnets relative to each other changes the magnetic flux on a side of the first adhesion magnet, the method comprising;
 (a) measuring a net force between a robot and surface;
 (b) using a controller to determine whether to adjust the net force;
 (c) adjusting the magnetic attraction force between the robot and the surface by adjusting the positions of the permanent magnets within the array based on the controller's determination; and
 (d) moving the robot along the surface.

21. The method of claim 20, wherein act (d) comprises transporting a payload with the robot.

22. The method of claim 20, wherein the one or more adhesion magnets comprises an electromagnet, and adjusting the magnetic attraction force comprises adjusting an electrical current supplied to the electromagnet.

* * * * *